(12) United States Patent
Taylor et al.

(10) Patent No.: US 7,520,995 B2
(45) Date of Patent: Apr. 21, 2009

(54) DILUTION APPARATUS FOR A THICKENER

(75) Inventors: David John Buchanan Taylor, New South Wales (AU); Jeffrey Victor Belke, Western Australia (AU)

(73) Assignee: Outotec Oyj, Espoo (FI)

( * ) Notice: Subject to any disclaimer, the term of this patent is extended or adjusted under 35 U.S.C. 154(b) by 462 days.

(21) Appl. No.: 10/512,910

(22) PCT Filed: Apr. 30, 2003

(86) PCT No.: PCT/AU03/00506

§ 371 (c)(1),
(2), (4) Date: Oct. 29, 2004

(87) PCT Pub. No.: WO03/095062

PCT Pub. Date: Nov. 20, 2003

(65) Prior Publication Data

US 2005/0155917 A1 Jul. 21, 2005

(30) Foreign Application Priority Data

May 7, 2002 (AU) .................................... PS2177

(51) Int. Cl.
*B01D 21/24* (2006.01)
(52) U.S. Cl. .................. 210/712; 210/97; 210/194; 210/740; 417/423.3
(58) Field of Classification Search .............. 417/423.3; 210/519, 194, 197, 712
See application file for complete search history.

(56) References Cited

U.S. PATENT DOCUMENTS

| 4,055,494 A | 10/1977 | Emmett, Jr. |
| 4,579,655 A | 4/1986 | Louboutin et al. |
| 5,389,250 A | 2/1995 | Wood et al. ................. 210/194 |
| 5,893,970 A | 4/1999 | Wood et al. |

FOREIGN PATENT DOCUMENTS

| CL | 1035-92 | 9/1992 |
| SU | 738635 A | 6/1980 |

OTHER PUBLICATIONS

Eurasian Search Report and English Translation, not dated.
Chilean Search Report, not dated.
Lightnin brochure LA-102, *Thickening and Clarification Dynamics*, published no later than Nov. 2001 at http://www.lightninmixers.com.

*Primary Examiner*—Terry K Cecil
(74) *Attorney, Agent, or Firm*—Morgan & Finnegan, L.L.P.

(57) ABSTRACT

The invention provides a dilution apparatus for a thickener of the type having a thickening tank and a feedwell disposed upstream of the tank to receive feed liquid, said dilution apparatus including: a receiving vessel adapted for at least partial submersion within the thickening tank to receive supernatant dilution liquid therefrom; and a submersible pump including an impeller adapted for at least partial submersion within the dilution liquid, the pump being adapted to transfer the dilution liquid from the thickening tank through the receiving vessel to the feed liquid for dilution thereof, before transfer of the feed liquid from the feedwell into the thickening tank. The pump is responsive to system parameters for adjusting the flow rate of the supernatant liquid.

40 Claims, 6 Drawing Sheets

DILUTION APPARATUS FOR A THICKENER

FIELD OF THE INVENTION

The present invention relates to separation devices for liquid suspensions and pulps and in particular to recycling of overflow liquor in thickeners. It has been developed primarily for use in separating mineral pulp from a liquid suspension and will be described hereinafter with reference to this application. However, it will be appreciated that the invention is not limited to this particular field of use.

BACKGROUND OF THE INVENTION

The following discussion of the prior art is intended to present the invention in an appropriate technical context and allow its significance to be properly appreciated. Unless clearly indicated to the contrary, however, reference to any prior art in this specification should not be construed as an admission that such art is widely known or forms part of common general knowledge in the field.

Thickeners are known as a means of separating suspended pulps. They are commonly used in the field of mineral processing and extraction, as well as in other industries.

Known thickeners typically include a thickening tank and a feedwell. The feedwell includes a chamber having an inlet for receiving feed slurry and an outlet in fluid communication with the tank. In use, flocculation takes place in the tank, whereby pulp of higher relative density tends to settle towards the bottom of the tank, forming a bed of thickened pulp, and dilute liquor of lower relative density is thereby displaced towards the top of the tank.

The feedwell is configured to reduce the turbulence of the incoming feed slurry, to allow flocculants to be mixed into the liquid, and to allow sufficient residence time for reaction between flocculants and reagents, before the treated liquid is discharged into the thicken tank. The configuration of the feedwell is typically also intended to promote uniform distribution of slurry flowing from its outlet into the thickening tank.

Feed slurry concentration affects the rate of floc formation, and the dosage rate of flocculant required to achieve optimum separation. It also affects thickener performance in terms of overflow clarity and underflow density versus flocculant consumption. Accordingly, the feed slurry entering the feedwell frequently requires dilution in order to achieve an optimum result.

Existing technologies achieve feed slurry dilution by several methods. Some methods involve pumping supernatant or new liquid into the feed stream. Relatively newer methods, however, use liquid from within the thickening tank to dilute the feed stream. These newer methods typically employ mechanisms of differential density or momentum transfer to move the liquid from the thickening tank into the feed stream.

All of these existing methods have disadvantages. Those utilising pumps require considerable pipework and electrical power to transfer the diluting liquid. Conversely, the internal systems, which use differential density or momentum transfer mechanisms, are relatively simpler and require little to no electrical power, but lack means to precisely control dilution under all operating conditions.

It is an object of the invention to overcome or substantially ameliorate one or more of the deficiencies of the prior art, or at least to provide a useful alternative.

DISCLOSURE OF THE INVENTION

According to a first aspect, the invention provides a dilution apparatus for a thickener of the type having a thickening tank and a feedwell disposed upstream of the tank to receive feed liquid, said dilution apparatus including:

A receiving vessel adapted for at least partial submersion within the thickening tank to receive supernatant dilution liquid therefrom; and a submersible pump including an impeller adapted for at least partial submersion within the dilution liquid; the pump being adapted to transfer the dilution liquid from the thickening tank through the receiving vessel to the feed liquid for dilution thereof before transfer of the feed liquid from the feedwell into the thickening tank.

Preferably, the receiving vessel is connected for fluid communication with the feedwell. Preferably, the apparatus further includes control means to regulate the flow rate of the dilution liquid in response to one or more selected system parameters. The flow rate is preferably varied by adjusting the pump speed.

In the preferred embodiment, the feedwell is disposed substantially within the thickening tank, the dilution apparatus is positioned substantially within the tank, and all plumbing and pipe work for the dilution apparatus is substantially contained within an outer perimeter of the tank. Preferably also, the dilution apparatus is positioned closely adjacent the feedwell so as to minimise intermediate plumbing and pipe work within the tank.

The pump is preferably an axial flow pump. Preferably, the receiving vessel is generally cup shaped and is submerged in the supernatant dilution liquid. Preferably, the impeller is mounted on a rotatable shaft. The shaft is preferably driven by a motor and gearbox.

Preferably, the impeller is located substantially within the receiving vessel. In a preferred embodiment, the receiving vessel forms part of the pump. Preferably, the impeller transfers the dilution liquid into the feed liquid. Preferably, the dilution liquid is injected into the feed liquid upstream of the feedwell. Preferably, the dilution liquid is injected into a feed inlet upstream of the feedwell. In one preferred embodiment, the dilution liquid is injected into a feed pipe upstream of the feedwell. In an alternative embodiment, however, the dilution liquid is injected directly into the feedwell. Preferably, a relatively small head difference is maintained between a liquid surface in the feedwell and a liquid surface in the thickening tank.

In one preferred embodiment, the dilution liquid is injected into a feed pipe upstream of the feedwell. In an alternative embodiment, however, the dilution liquid is injected directly into the feedwell.

According to a second aspect, the invention provides a thickener including:

a thickening tank;

a feedwell located upstream of said tank to receive feed liquid; and a dilution apparatus as previously defined;

The impeller being at least partially submerged within the dilution liquid, the pump being adapted to transfer the dilution liquid from the thickening tank through the receiving vessel to the feed liquid for dilution thereof, before transfer of the feed liquid from the feedwell to the tank.

Preferably, the thickener further includes control means to regulate the flow rate of the dilution liquid in response to one or more selected system parameters.

In the preferred embodiment, the feedwell is disposed substantially within the thickening tank, the dilution apparatus is positioned substantially within the tank, and all plumbing and pipe work for the dilution apparatus is substantially contained within the outer perimeter of the tank. Preferably also, the dilution apparatus is positioned closely adjacent the feedwell so as to minimise intermediate plumbing and pipe work within the tank. The feedwell is preferably positioned substantially centrally within the tank.

According to a third aspect, the invention provides a method of diluting feed liquid in a thickener having a thickening tank and a feedwell located upstream of said tank to receive feed liquid, said method including the steps of:

Providing a receiving vessel adapted for at least partial submersion within the thickening tank to receive supernatant dilution liquid therefrom; providing a submersible pump including an impeller;

Submerging the impeller at least partially within the dilution liquid; and

Actuating the pump so as to transfer the dilution liquid from the thickening tank through the receiving vessel to the feed liquid for dilution thereof, before transferring the feed liquid from the feedwell to the tank.

Preferably, the method includes the further step of controlling the flow rate of the dilution liquid in response to one or more selected system parameters.

Preferably, the method also includes the step of maintaining a relatively small head difference between a liquid surface in the feedwell and a liquid surface in the thickening tank.

Preferably, the method includes the further step of injecting the dilution liquid into the feed liquid. Preferably, the dilution liquid is injected into the feed liquid upstream of the feedwell. Preferably, the dilution liquid is injected into a feed inlet upstream of the feedwell. Preferably, the dilution liquid is injected into a feed pipe upstream of the feedwell. Alternatively, the dilution liquid is injected directly into the feedwell. In the preferred embodiment, the method includes the steps of positioning the feedwell substantially within the thickening tank, positioning the dilution apparatus substantially within the tank, and containing the plumbing and pipe work for the dilution apparatus substantially within the outer perimeter of the tank. Preferably also, the dilution apparatus is positioned closely adjacent the feedwell so as to minimise the intermediate plumbing and pipe work within the tank.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
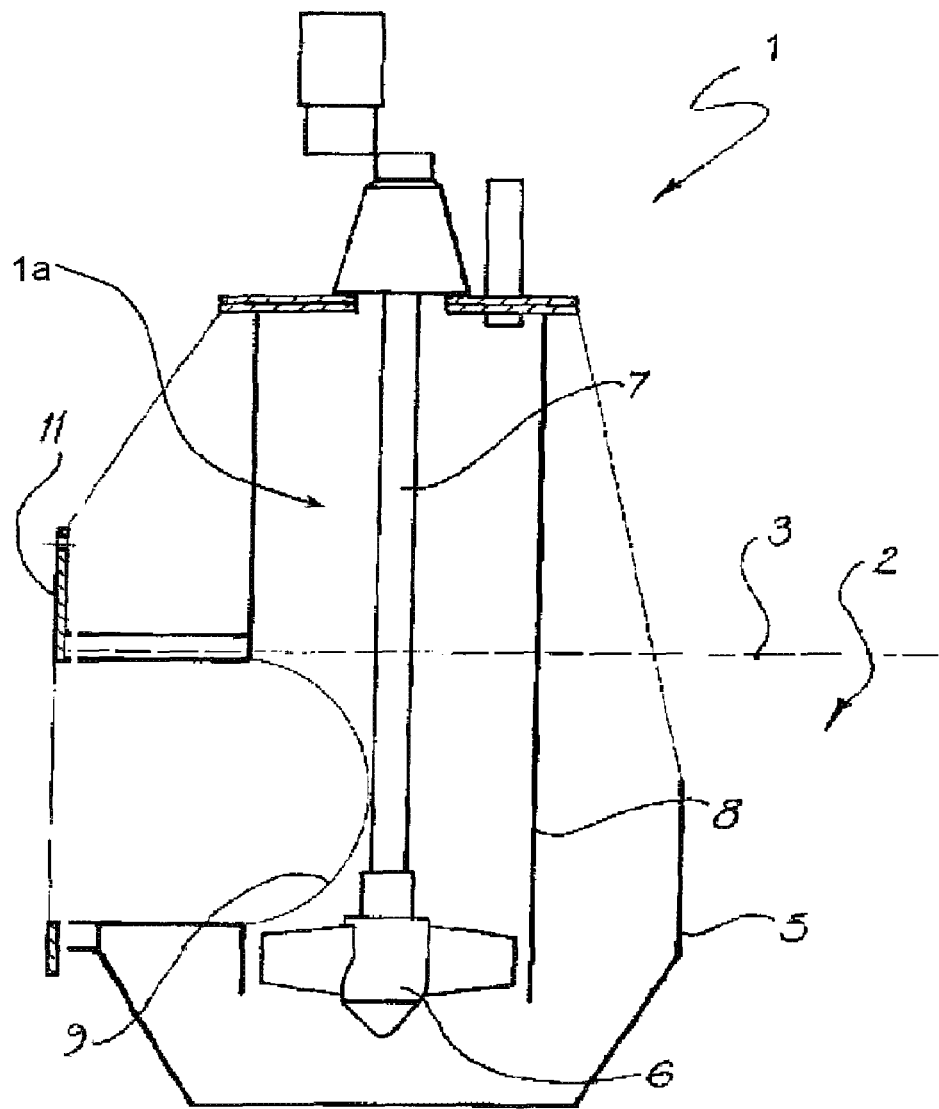
FIG. 1 is a sectional side elevation of one embodiment of a dilution apparatus according to the invention.

A preferred application of the invention is in the field of mineral processing, separation and extraction, whereby finely ground ore is suspended as pulp in a suitable liquid medium, such as water, at a consistency which permits flow, and settlement in quiescent conditions.

Referring to the drawings, the dilution apparatus 1 includes an axial flow pump 1a for accurately injecting supernatant liquid 2 from adjacent the liquid surface 3 of a thickening tank (not shown) to dilute liquid in a feedwell 4. The pump dilution apparatus 1 also includes a cup shaped receiving vessel 5 submerged in the supernatant liquid to receive the supernatant dilution liquid 2.

The pump 1a includes a submerged impeller 6 adapted for at least partial submersion within the dilution liquid 2, and is thereby adapted to transfer the dilution liquid 2 from the thickening tank through the receiving vessel 5 to the feed liquid for dilution thereof, before transfer of the feed liquid from the feedwell 4 to the thickening tank. The impeller 6 is mounted on a rotatable shaft 7 for drawing liquid through the vessel 5 and injecting it into the feedwell 4. The shall 7 is driven by a motor and associated gearbox (not shown). The pump is responsive to system parameters for adjusting the flow rate of the supernatant liquid. In the illustrated embodiment, the flow rate is adjusted by varying the pump speed. However, in other embodiments, the flow rate is adjusted using control valves or other means.

The impeller 6 and shaft 7 are housed in a vertical cylindrical chamber 8 extending upwards from below the impeller. The chamber extends above the surface 3 of the supernatant liquid, thereby overcoming the requirement for a seal at its apex and allowing for access and removal of the impeller 6. The chamber also includes an outlet port 9 located above the impeller 6 for directing pumped fluid into a feed pipe 10 of the feedwell 4.

In use, the motor is activated to drive the shaft 7 and the impeller 6. The rotation of the impeller draws supernatant liquid from the thickening tank into and through the vessel 5 and up through the chamber 8. This increases the pressure head between the liquid level in the thickening tank and the outlet port 9 and forces the liquid through the outlet and into the feed pipe 10 for dilution of the feed liquid. In other embodiments, the dilution liquid is not injected into a feed pipe. Instead, the dilution liquid is injected or otherwise transferred into the feed liquid upstream of the feedwell or into a feed inlet, channel or through upstream of the feedwell to effect dilution of the feed liquid.

In an alternative embodiment, the vessel 5 includes an additional aperture at its base to provide an additional path for liquid to be drawn.

Figure 2:
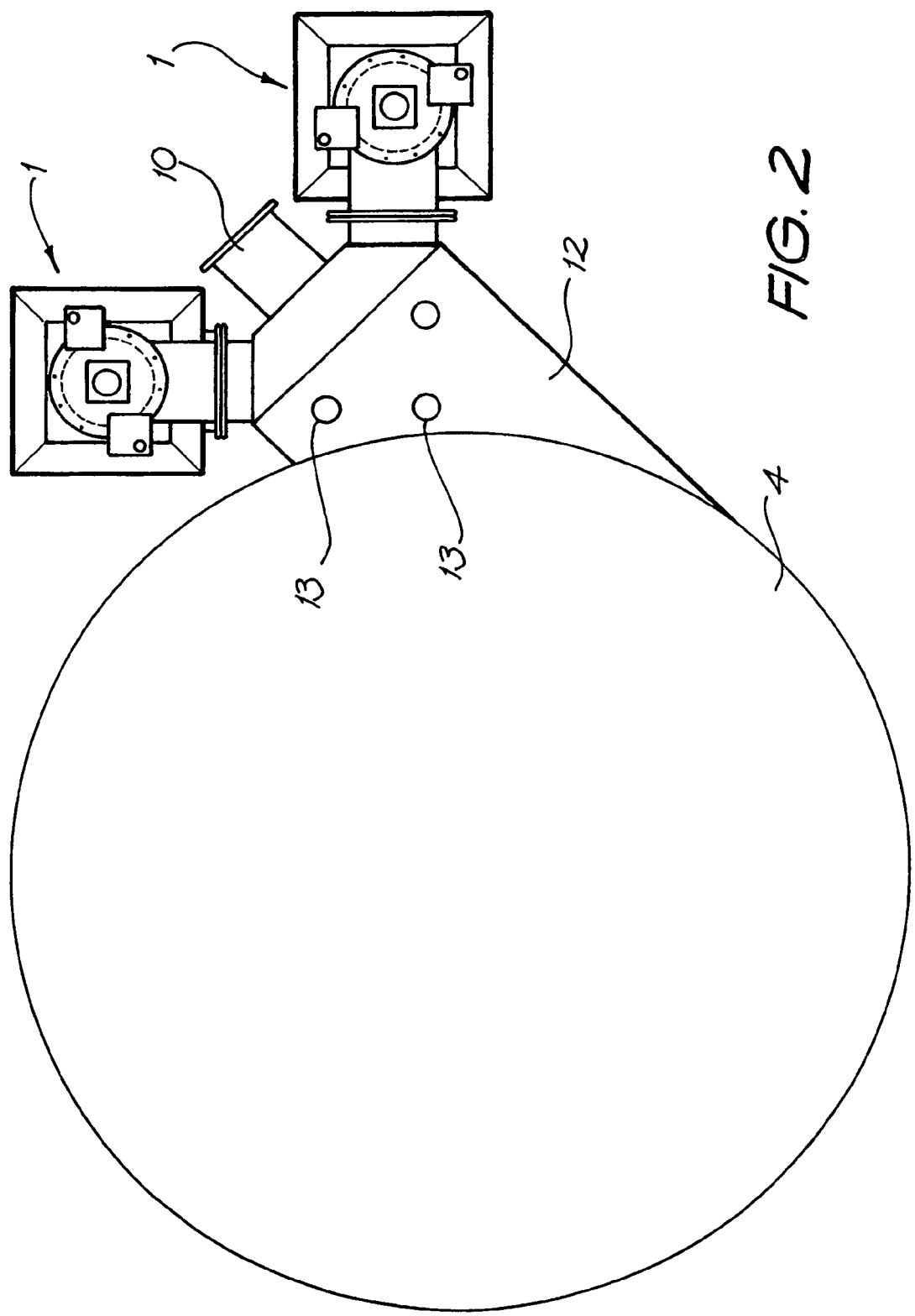
FIG. 2 is a plan view of a thickener feedwell incorporating the dilution apparatus.
Figure 3:
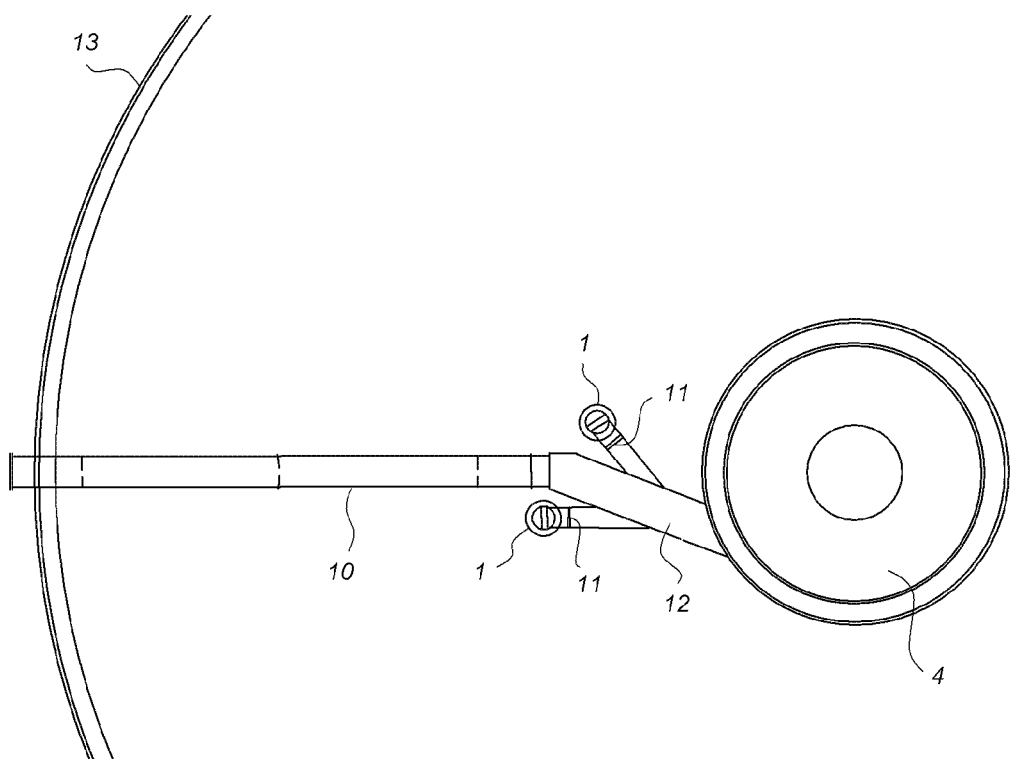
FIG. 3 is a partial plan view of the dilution apparatus and feedwell of FIG. 2 in a thickening tank.
Figure 4:
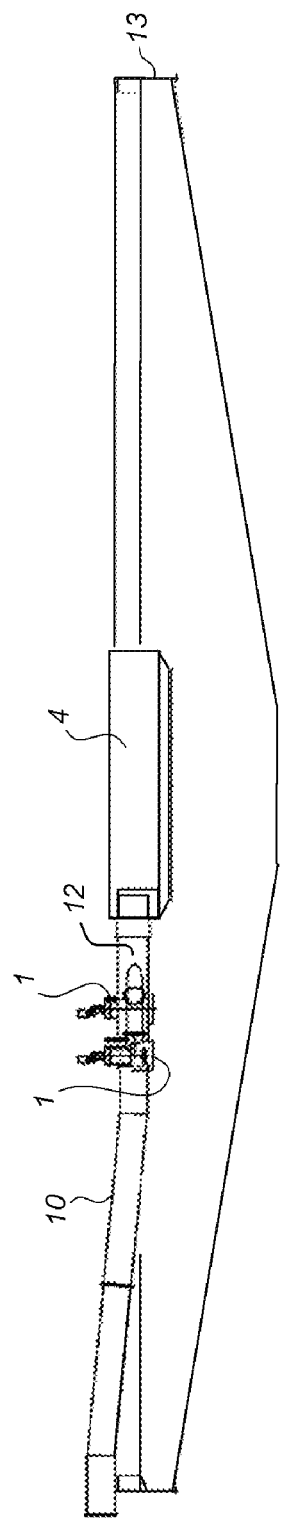
FIG. 4 is a cross-sectional view of the dilution apparatus, feedwell and thickening tank of FIG. 2.
Figure 5:
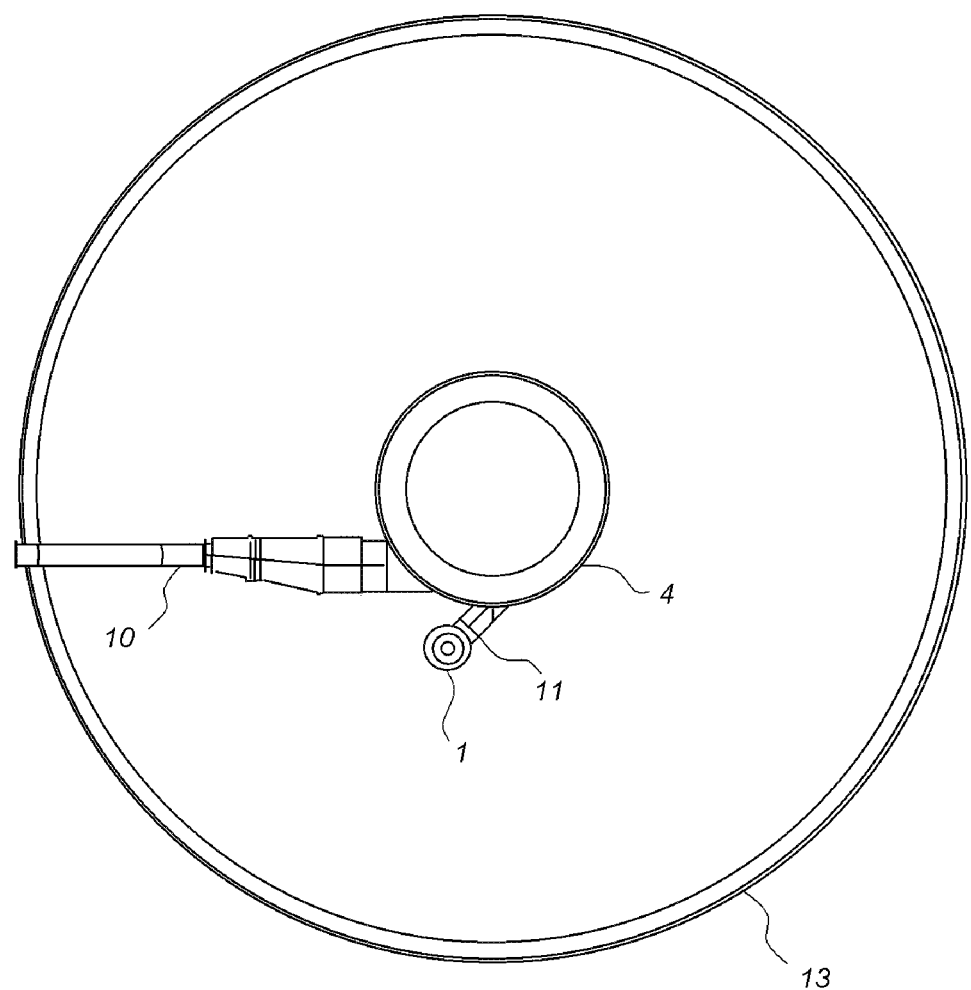
FIG. 5 is a partial plan view of one embodiment of a dilution apparatus attached to a feedwell in a thickening tank.
Figure 6:
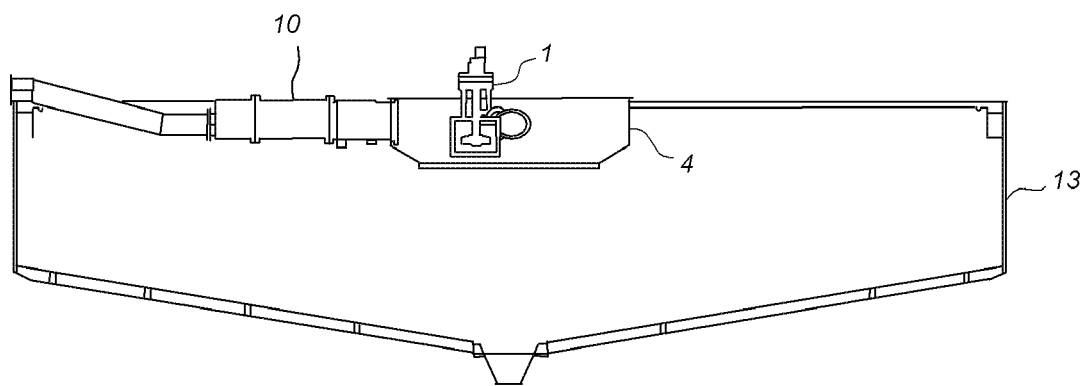
FIG. 6 is a cross-sectional view of the dilution apparatus, feedwell and thickening tank of FIG. 5.

The dilution apparatus also includes a mounting flange 11 to permit its bolting onto a mounting hub 12 of the feedwell. FIGS. 3 and 4 illustrate partial plan and cross-sectional views, respectively, of the dilution apparatus 1 of FIG. 2 in a thickening tank, where corresponding features have been given the same reference numerals. In other embodiments, the apparatus 1 is bolted onto the side of the feedwell itself to allow supernatant liquid to be injected directly into the feedwell, as illustrated in FIGS. 5 and 6, where corresponding features have been given the same reference numerals. FIG. 5 illustrates a partial plan view of the dilution apparatus 1 attached to the side of the feedwell 4 in a thickening tank 13, while FIG. 6 is a cross-sectional view of the dilution apparatus 1 attached to the side of the feedwell 4 in the thickening tank 13.

In the preferred embodiment described above, the pump 1a is an axial flow pump. However, it will be appreciated that alternative pump types can also be used to inject the supernatant liquid 2 into the feedwell 4. Piston pumps and vacuum pumps are examples of some alternatives pump types that could be used.

It will be appreciated that the illustrated apparatus provides an efficient and accurately controllable means for diluting the feed slurry in a thickener. As the head difference between the liquid surface in the feedwell 4 and the liquid surface 3 in the thickening tank are maintained at a similar level, the axial pump 1a requires only a small pressure head to drive the diluting supernatant liquid. The proximity of the apparatus to the feedwell reduces the amount of piping required and also reduces power consumption. Also, the apparatus does not require a wear resistant impeller as it pumps relatively clean liquid. The apparatus also allows flocculants to be introduced either upstream or downstream of the impeller to achieve dispersion and dilution of flocculants prior to contact with solid particles in the stream. In this embodiment, flocculent is added through apertures 13 in the feed pipe 10.

In all these respects, the invention represents a practical and commercially significant improvement over the prior art.

Although the invention has been described with reference to specific examples, it will be appreciated by those skilled in the art that the invention may be embodied in many other forms.

The invention claimed is:

1. A dilution apparatus for a thickener of the type having a thickening tank and a feedwell disposed upstream of the tank to receive feed liquid, said dilution apparatus including:
   a receiving vessel adapted for at least partial submersion within the thickening tank to receive a supernatant dilution liquid therefrom; and
   a submersible pump including an impeller adapted for at least partial submersion within the dilution liquid in the receiving vessel;
   the submersible pump being adapted to transfer the dilution liquid from the thickening tank through the receiving vessel to the feed liquid for dilution thereof, before the feed liquid exits the feedwell.

2. The dilution apparatus according to claim 1, further including a control means to regulate a flow rate of the dilution liquid in response to one or more selected system parameters.

3. The dilution apparatus according to claim 2, wherein the flow rate is varied by adjusting the pump speed.

4. The dilution apparatus according to claim 1, wherein the feedwell is disposed within the thickening tank, the dilution apparatus is positioned within the tank, and all plumbing and pipe work for the dilution apparatus is contained within an outer perimeter of the tank.

5. The dilution apparatus according to claim 4, wherein the dilution apparatus is positioned adjacent the feedwell so as to minimize intermediate plumbing and pipe work within the tank.

6. The dilution apparatus according to claim 1, wherein the pump is an axial flow pump.

7. The dilution apparatus according to claim 1, wherein the receiving vessel is cup shaped and is submerged in the supernatant dilution liquid.

8. The dilution apparatus according to claim 7, wherein the impeller is mounted on a rotatable shaft.

9. The dilution apparatus according to claim 8, wherein the shaft is driven by a motor and gearbox.

10. The dilution apparatus according to claim 8, wherein the impeller and shaft are housed in a vertically oriented elongated chamber extending upwardly from below the impeller.

11. The dilution apparatus according to claim 10, wherein the chamber is cylindrical in shape, and includes an outlet port for directing pumped fluid into the feedwell.

12. The dilution apparatus according to claim 1, wherein the dilution liquid is injected into a feed pipe upstream of the feedwell.

13. The dilution apparatus according to claim 1, wherein the dilution liquid is injected directly into the feedwell.

14. The dilution apparatus according to claim 1, wherein the receiving vessel is connected for fluid communication with the feedwell.

15. The dilution apparatus according to claim 1, wherein the impeller is located within the receiving vessel.

16. The dilution apparatus according to claim 1, wherein the receiving vessel forms part of the pump.

17. The dilution apparatus according to claim 1, wherein the impeller transfers the dilution liquid into the feed liquid.

18. The dilution apparatus according to claim 1, wherein the dilution liquid is injected into the feed liquid upstream of the feedwell.

19. The dilution apparatus according to claim 1, wherein the dilution liquid is injected into a feed inlet upstream of the feedwell.

20. The dilution apparatus according to claim 1, wherein a head difference is maintained between the liquid surface in the feedwell and a liquid surface in the thickening tank to facilitate transfer of the supernatant liquid.

21. The dilution apparatus according to claim 1, wherein the dilution apparatus is attached to a mounting hub of the feedwell.

22. The dilution apparatus according to claim 1, wherein the dilution apparatus is attached to the side of the feedwell.

23. The dilution apparatus according to claim 1, further including one or more outlet ports for directing pumped fluid into the feedwell.

24. A thickener including:
   a thickening tank;
   a feedwell located upstream of said tank to receive feed liquid; and
   the dilution apparatus as defined in any of claims 1-13 or 14-23;
   the impeller being at least partially submerged within the dilution liquid, the pump being adapted to transfer the dilution liquid from the thickening tank through the receiving vessel to the feed liquid for dilution thereof, before the feed liquid exits the feedwell.

25. A method of diluting feed liquid in a thickener having a thickening tank and a feedwell located upstream of said tank to receive feed liquid, said method including the steps of:
   providing a dilution apparatus having a receiving vessel and a submersible pump, the receiving vessel adapted for at least partial submersion within the thickening tank to receive a supernatant dilution liquid therefrom;
   providing the submersible pump with an impeller;
   submerging the impeller at least partially within the dilution liquid in the receiving vessel; and
   actuating the pump so as to transfer the dilution liquid from the thickening tank through the receiving vessel to the feed liquid for dilution thereof, before the feed liquid exits the feedwell.

26. The method according to claim 25, including the further step of controlling the flow rate of the dilution liquid in response to one or more selected system parameters.

27. The method according to claim 25, wherein the pump is an axial flow type pump.

28. The method according to claim 25, wherein receiving vessel is cup shaped and is submerged in the dilution liquid.

29. The method according to claim 25, including the further step of injecting the dilution liquid into the feed liquid.

30. The method according to claim 25, wherein the dilution liquid is injected into a feed pipe of the feedwell.

31. The method according to claim 25, wherein the dilution liquid is injected directly into the feedwell.

32. The method according to claim 25, including the further step of maintaining a head difference between a liquid surface in the feedwell and a liquid surface in the thickening tank to facilitate transfer of the supernatant liquid.

33. The method according to claim 25, including the further steps of positioning the feedwell within the thickening tank, positioning the dilution apparatus within the tank, and containing all plumbing and pipe work for the dilution apparatus within an outer perimeter of the tank.

34. The method according to claim 33, including the further step of positioning the dilution apparatus adjacent the feedwell and thereby minimizing intermediate plumbing and pipe work within the tank.

35. The method according to claim 33, wherein the feedwell is positioned centrally within the tank.

36. The method according to claim 25, including the further step of injecting the dilution liquid into the feed liquid upstream of the feedwell.

37. The method according to claim 25, including the further step of injecting the dilution liquid into a feed inlet upstream of the feedwell.

38. The method according to claim 25, further including the step of attaching the dilution apparatus to a mounting hub of the feedwell.

39. The method according to claim 25, further including the step of attaching the dilution apparatus to the side of the feedwell.

40. The method according to claim 25, further including the step of directing pumped liquid into the feedwell via one or more outlet ports.

* * * * *